(12) United States Patent
Hendry et al.

(10) Patent No.: US 10,560,710 B2
(45) Date of Patent: Feb. 11, 2020

(54) METHOD FOR CODING RECOVERY POINT SUPPLEMENTAL ENHANCEMENT INFORMATION (SEI) MESSAGES AND REGION REFRESH INFORMATION SEI MESSAGES IN MULTI-LAYER CODING

(71) Applicant: QUALCOMM Incorporated, San Diego, CA (US)

(72) Inventors: Fnu Hendry, Poway, CA (US); Ye-Kui Wang, San Diego, CA (US); Adarsh Krishnan Ramasubramonian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 140 days.

(21) Appl. No.: 14/584,993

(22) Filed: Dec. 29, 2014

(65) Prior Publication Data

US 2015/0195555 A1 Jul. 9, 2015

Related U.S. Application Data

(60) Provisional application No. 61/923,601, filed on Jan. 3, 2014.

(51) Int. Cl.
*H04N 19/46* (2014.01)
*H04N 19/52* (2014.01)

(52) U.S. Cl.
CPC ............. *H04N 19/46* (2014.11); *H04N 19/52* (2014.11)

(58) Field of Classification Search
CPC ........................... H04N 13/0242; G06T 1/0007
(Continued)

(56) References Cited

U.S. PATENT DOCUMENTS

2008/0013620 A1 1/2008 Hannuksela et al.
2008/0216116 A1* 9/2008 Pekonen .......... H04N 21/23614
725/39

(Continued)

FOREIGN PATENT DOCUMENTS

CN 101291434 A 10/2008
CN 101536527 A 9/2009
(Continued)

OTHER PUBLICATIONS

Flynn D., et al., "HEVC Range Extensions Draft 5", 15.JCT-VC Meeting, Oct. 23, 2013-Nov. 11, 2013, Geneva, (Joint Collaborative Team on Video Coding of ISO/IEC JTC1/SC29/WG11 and ITU-T SG.16), URL: http://wftp3.itu.int/av-arch/jctvc-site/,, No. JCTVC-O1005, Nov. 19, 2013 (Nov. 19, 2013), XP030115459; 340 pages.
(Continued)

*Primary Examiner* — William C Vaughn, Jr.
*Assistant Examiner* — Jerry T Jean Baptiste
(74) *Attorney, Agent, or Firm* — Shumaker & Sieffert, P.A.

(57) ABSTRACT

Methods for coding recovery point supplemental enhancement information (SEI) messages and region refresh SEI messages in multi-layer coding are disclosed. In one aspect, the method may include determining at least one picture among a plurality of pictures included within an access unit with which to associate at least one recovery point SEI message, the access unit being included within the multi-layer bitstream. The method may further include associating the at least one recovery point SEI message with the determined at least one picture. The method may also include coding the video information based at least in part on the association of the at least one recovery point SEI message with the determined at least one picture.

20 Claims, 11 Drawing Sheets

(58) Field of Classification Search
USPC .......................................................... 375/240
See application file for complete search history.

(56) References Cited

U.S. PATENT DOCUMENTS

| | | | | |
|---|---|---|---|---|
| 2010/0189182 | A1* | 7/2010 | Hannuksela ... | H04N 21/234327 375/240.25 |
| 2013/0235152 | A1* | 9/2013 | Hannuksela ......... | H04N 19/597 348/43 |
| 2016/0094860 | A1* | 3/2016 | Minezawa ............ | H04N 19/16 375/240.12 |
| 2016/0156914 | A1* | 6/2016 | Suehring ............... | H04L 69/324 375/240.12 |

FOREIGN PATENT DOCUMENTS

| | | |
|---|---|---|
| EP | 2136559 A1 | 12/2009 |
| JP | 2009518981 A | 5/2009 |
| WO | 2007067990 A2 | 6/2007 |
| WO | WO-2013030458 A1 | 3/2013 |
| WO | 2013181595 A2 | 12/2013 |

OTHER PUBLICATIONS

Hannuksela M.M., et al., "AHG9: Operation points in UPS and nesting SEI", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/; No. JCTVC-K0180, Oct. 1, 2012 (Oct. 1, 2012), XP030113062; 5 pages.

Hannuksela M.M., et al., "Scope of SEI messages", 20. JCT Meeting; 77. MPEG Meeting; Jul. 15, 2006-Jul. 21, 2006;Klagenfurt, AT; (Joint Video Team of ISO/IEC JTC1/SC29/WG11 and ITU-TSG.16 ) No. JVT-T073, Jul. 12, 2006 (Jul. 12, 2006), XP030006560; 6 pages.

Hendry et al., "MV-HEVC/SHVC HLS: On Recovery Point and Region Refresh SEI Messages", 7.JCT-3V Meeting, Jan. 1, 2014-Jan. 17, 2014, San Jose, (The Joint Collaborative Team on 3D Video Coding Extension Development of ISO/IEC JTC1/SC29/WG11 and ITU-T SG.16), URL: http://phenix.int-evry.fr/jct2/,, No. JCT3V-G0134, Jan. 4, 2014 (Jan. 4, 2014), XP030131912; 5 pages.

International Search Report and Written Opinion—PCT/US2014/072715—ISA/EPO—dated Mar. 25, 2015.

"Text of ISO/IEC 14496-10:2005 (AVC 3rd edition)", 72.MPEG Meeting, Apr. 18, 2005-Apr. 22, 2005, Busan, (Motion Pictureexpert Group or ISO/IEC JTC1/SC29/WG11),, No. N7081, Aug. 11, 2005 (Aug. 11, 2005), XP030013753, 332 pages.

Wang Y-K (Qualcomm): "AHG9: Signalling of Regions of Interest and Gradual Decoding Refresh", 102. MPEG Meeting, Oct. 15, 2012-Oct. 19, 2012, Shanghai, (Motion Picture Expert Group or ISO/IEC JTC1/SC29/WG11),, No. K0128r2, Oct. 17, 2012 (Oct. 17, 2012), XP030054753, 6 pages.

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

"H. 265 High efficiency video coding, ITU-T Standardization Sector (Series H) H.265", Apr. 30, 2013, https://www.itu.int/rec/dologin_pub.asp?lang=e&id=H.265-201304-S!!PDFE&type=items, pp. 231,250-251, 277-278.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T Rec. H.261 (Dec. 1990), "Line Transmission on Non-Telephone Signals, Video Codec for Audiovisual Services AT p × 64 kbit/s", 32 Pages.

ITU-T Rec. H.262 (Jul. 1995), "Transmission on Non-Telephone Signals, Information Technology—Generic Coding of Moving Pictures and Associated Audio Information: Video", Jul. 1995, 211 pp.

ITU-T Recommendation, H.264—Telecommunication Standardization Sector of ITU; Series H: Audiovisual and Multimedia Systems; Infrastructure of audiovisual services—Coding of moving video; "Advanced video coding generic audiovisual services", Mar. 2005, pp. 1-343.

* cited by examiner

METHOD FOR CODING RECOVERY POINT SUPPLEMENTAL ENHANCEMENT INFORMATION (SEI) MESSAGES AND REGION REFRESH INFORMATION SEI MESSAGES IN MULTI-LAYER CODING

INCORPORATION BY REFERENCE TO PRIORITY APPLICATION(S)

This application claims the benefit of U.S. Provisional Application No. 61/923,601, filed Jan. 3, 2014.

TECHNICAL FIELD

This disclosure relates to the field of video coding and compression, and particularly to scalable video coding, multiview video coding, and/or three-dimensional (3D) video coding.

BACKGROUND

Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

An encoded video sequence may include an optional supplemental enhancement information (SEI) message. SEI messages can provide information that is not necessary for the decoding of the video sequence, but may nevertheless aid in decoding the video sequence. One such SEI message is a recovery point SEI message which indicates a recovery point at which the decoded video sequence will be correct or approximately correct in content upon random access to the bitstream between intra random access point (IRAP) pictures. A region refresh information SEI message, which is associated with a recovery point SEI message, indicates whether regions (e.g., slice segments) of a current picture, that the current region refresh information SEI message applies/corresponds to, belong to a refreshed region of the current picture.

SUMMARY

The systems, methods and devices of this disclosure each have several innovative aspects, no single one of which is solely responsible for the desirable attributes disclosed herein.

In one aspect, a method for coding video information comprises determining at least one picture among a plurality of pictures included within an access unit with which to associate at least one recovery point supplemental enhancement information (SEI) message, the access unit being included within the multi-layer bitstream, associating the at least one recovery point SEI message with the determined at least one picture, and coding the video information based at least in part on the association of the at least one recovery point SEI message with the determined at least one picture.

In another aspect, a device for coding video information comprises a memory configured to store the video information and a processor in communication with the memory. The processor configured to determine at least one picture among a plurality of pictures included within an access unit with which to associate at least one recovery point SEI message, the access unit included in the multi-layer bitstream, associate the at least one recovery point SEI message with the determined at least one picture, and code the video information based at least in part on the association of the at least one recovery point SEI message with the determined at least one picture.

In another aspect, an apparatus comprises means for determining at least one picture among a plurality of pictures included within an access unit with which to associate at least one recovery point SEI message, the access unit being included within a multi-layer bitstream, means for associating the at least one recovery point SEI message with the determined at least one picture, and means for coding the video information based at least in part on the association of the at least one recovery point SEI message with the determined at least one picture.

In yet another aspect, a non-transitory computer readable storage medium has stored thereon instructions that, when executed, cause a processor of a device to determine at least one picture among a plurality of pictures included within an access unit with which to associate at least one recovery point SEI message, the access unit being included within a multi-layer bitstream, associate the at least one recovery point SEI message with the determined at least one picture, and code the video information based at least in part on the association of the at least one recovery point SEI message with the determined at least one picture.

DETAILED DESCRIPTION

Figure 1A:
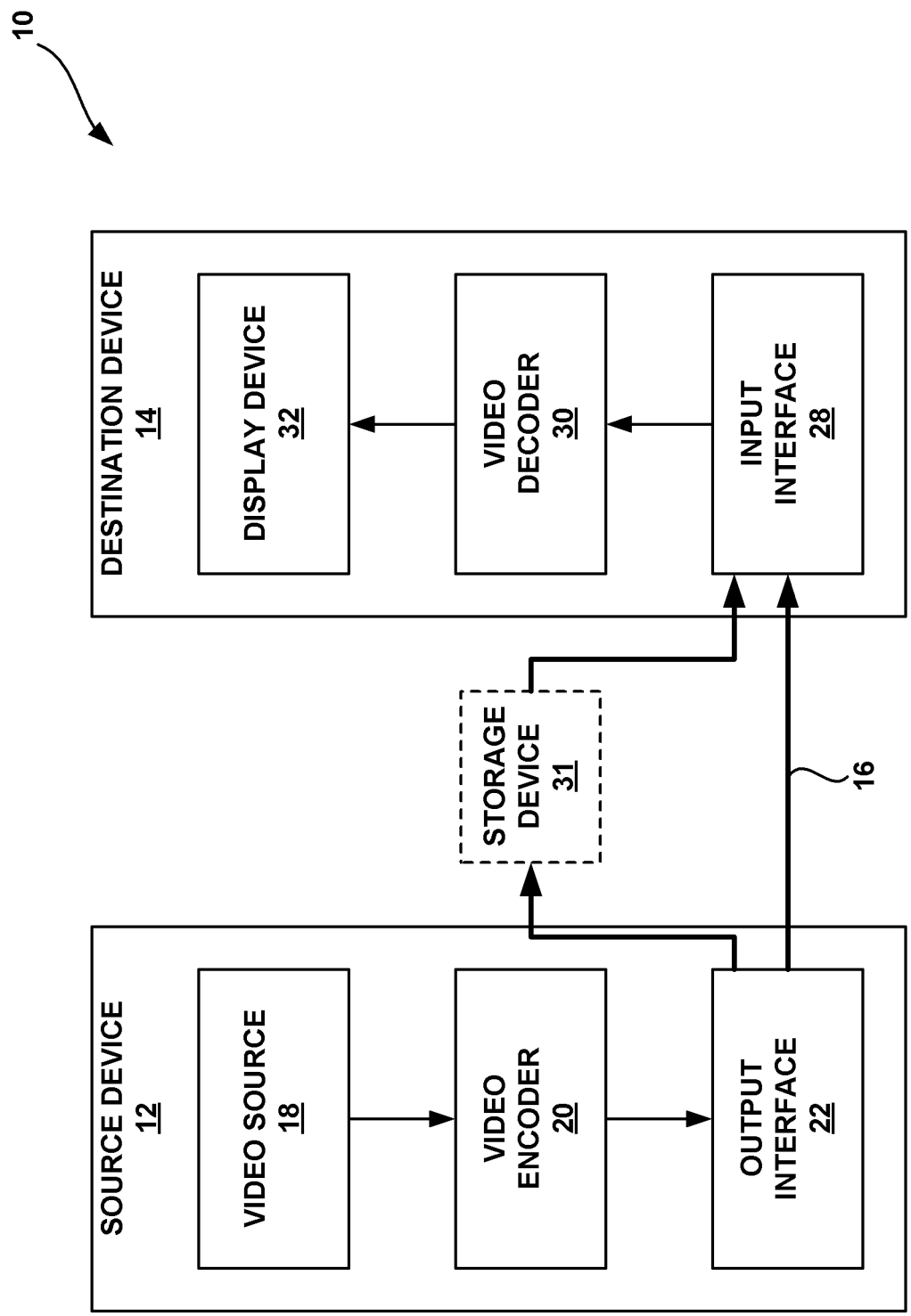
FIG. 1A is a block diagram illustrating an example video encoding and decoding system that may utilize techniques in accordance with aspects described in this disclosure.

In general, this disclosure relates to recovery point supplemental enhancement information (SEI) messages and refresh information SEI messages for multi-layer video coding in the context of advanced video codecs, such as High Efficiency Video Coding (HEVC). More specifically, the present disclosure relates to systems and methods for increased clarity of recovery point SEI messages and refresh information SEI messages in the multiview and scalable extensions of HEVC, namely MV-HEVC and SHVC.

In the description below, H.264/Advanced Video Coding (AVC) techniques related to certain embodiments are described; the HEVC standard and related techniques are also discussed. In particular, some video coding schemes include a recovery point SEI message which may assist a decoder in the determination of when the decoding process will produce acceptable pictures for display. In conventional single-layer coding schemes (e.g., HEVC Version 1), each access unit uniquely contains a single picture. Accordingly, the semantics of these conventional schemes treated an access unit and a picture as interchangeable. As discussed in greater detail below, the access unit of a multi-layer bitstream may include a plurality of pictures. Thus, conventional single-layer coding schemes do not have the required semantics to define how recovery point SEI messages are to be handled for accurate and consistent behavior of video encoders/decoders that conform to multi-layer coding schemes.

This disclosure relates to semantics for multi-layer coding schemes that resolve the ambiguity for recovery point SEI messages. In some implementations, a recovery point SEI message is unambiguously associated to specific pictures(s) of an access unit in a multi-layer bitstream. Since these semantics enable the coding of a multi-layer bitstream to unambiguously associate a recovery point SEI message with one or more specific pictures, the operation of video encoders/video decoders that conform (i.e., operate in accordance with or are configured in accordance with) to this disclosure have improved operational consistency over conventional coding schemes.

While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multi-view extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multiview extensions.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bit stream).

Figure 1B:
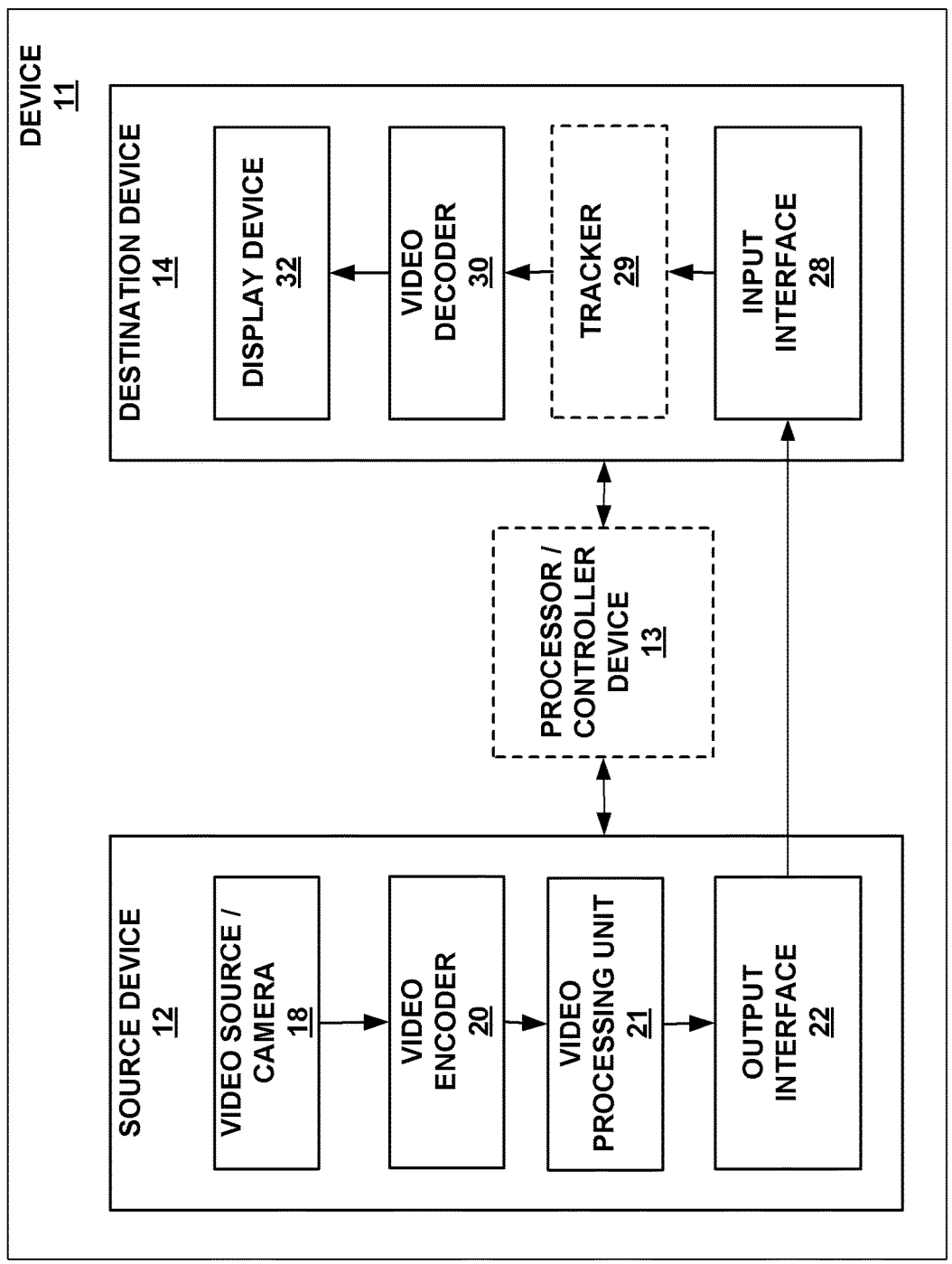
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller device 13. The video coding system 10' may also include a tracker 29 (optionally present), which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. An PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
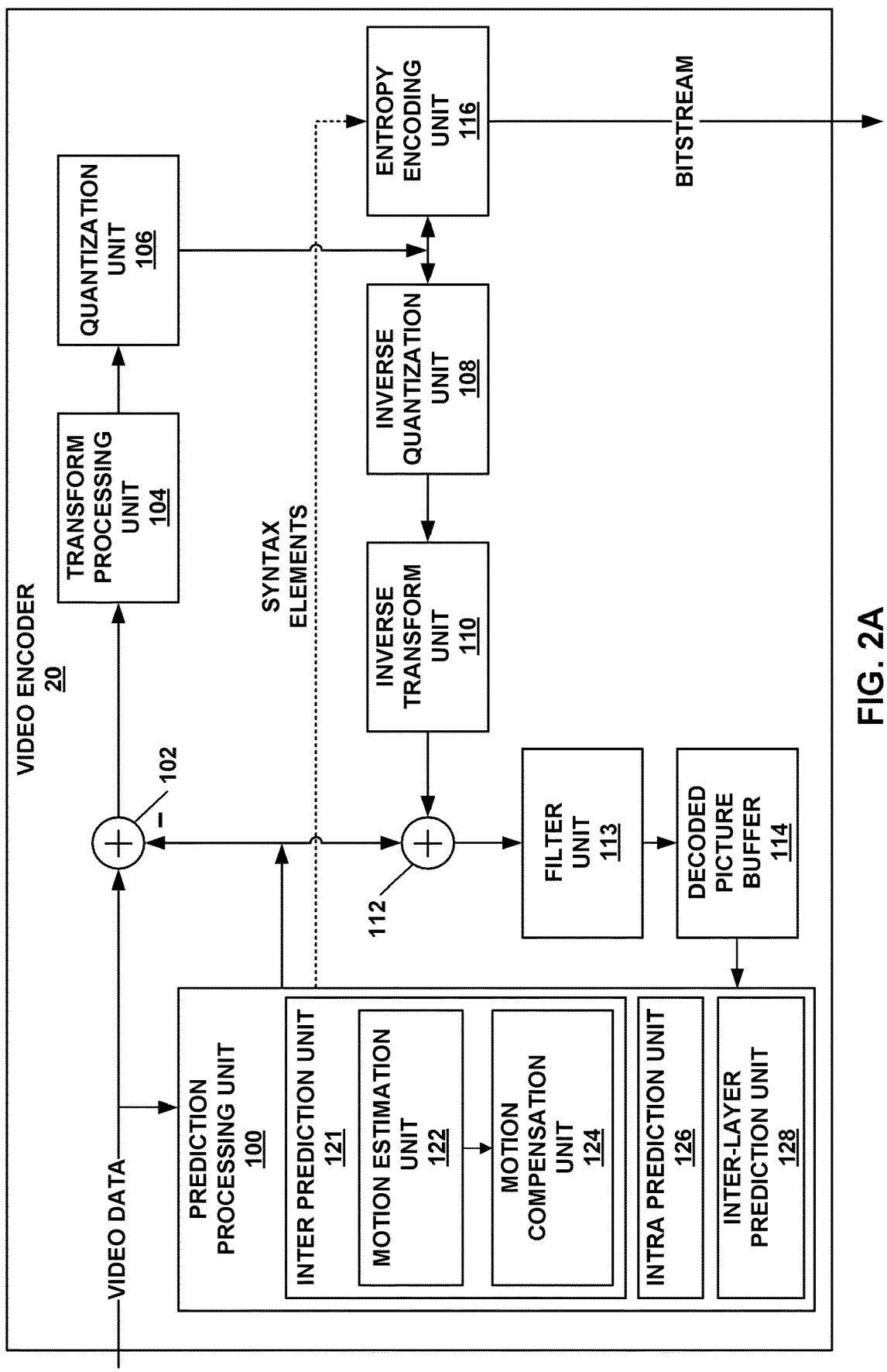
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
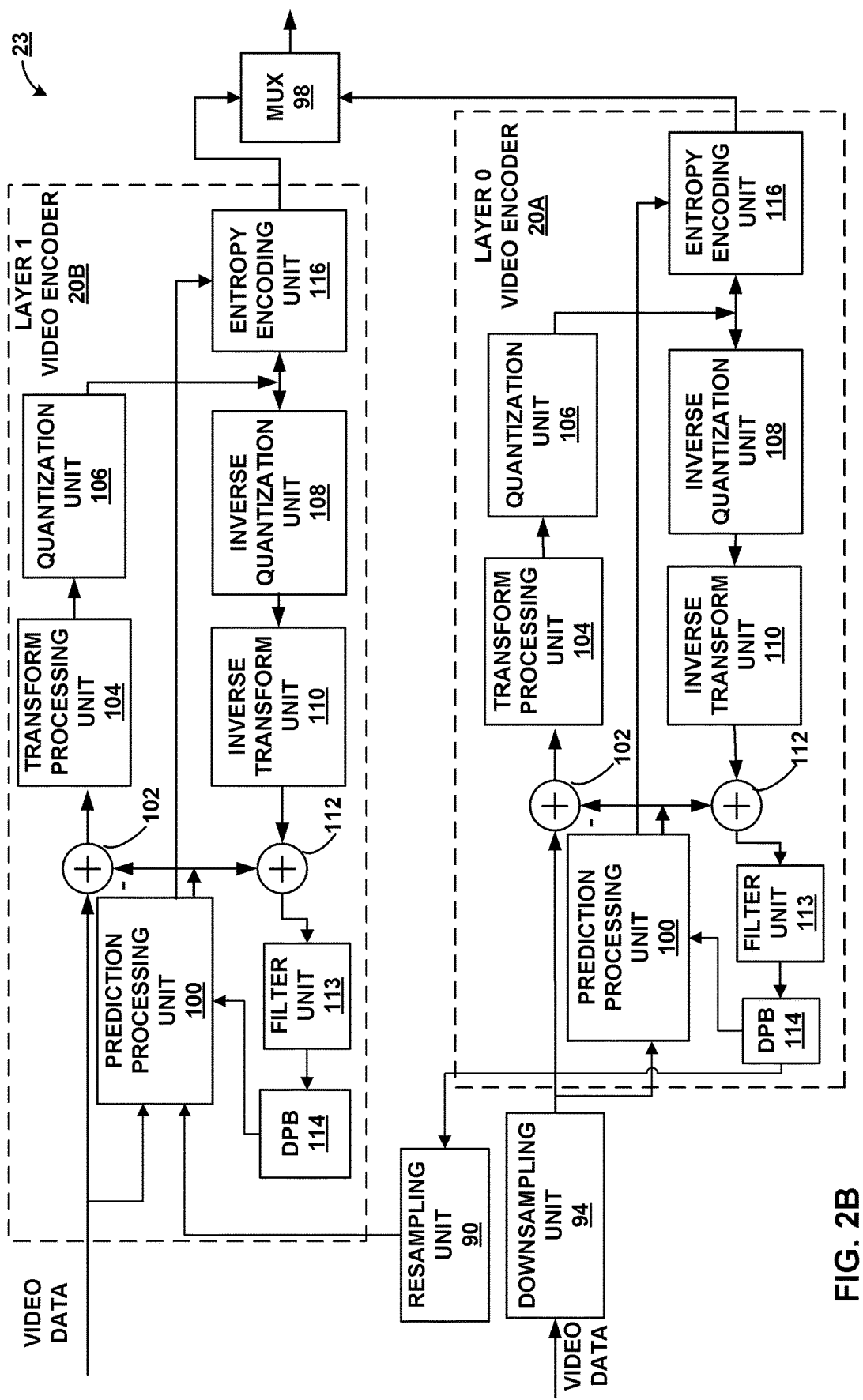
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and MV-HEVC. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor (or mux) 98. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
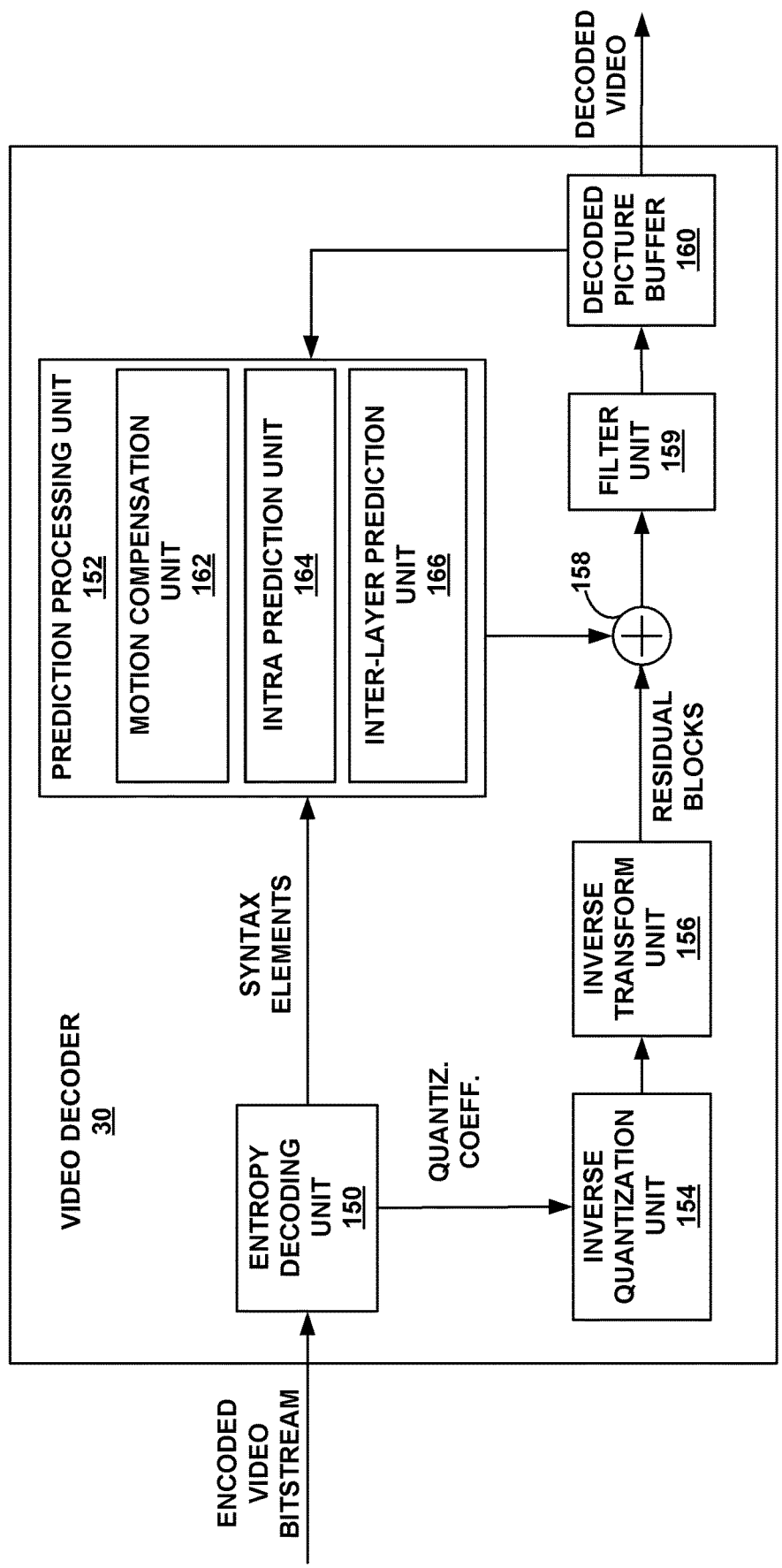
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
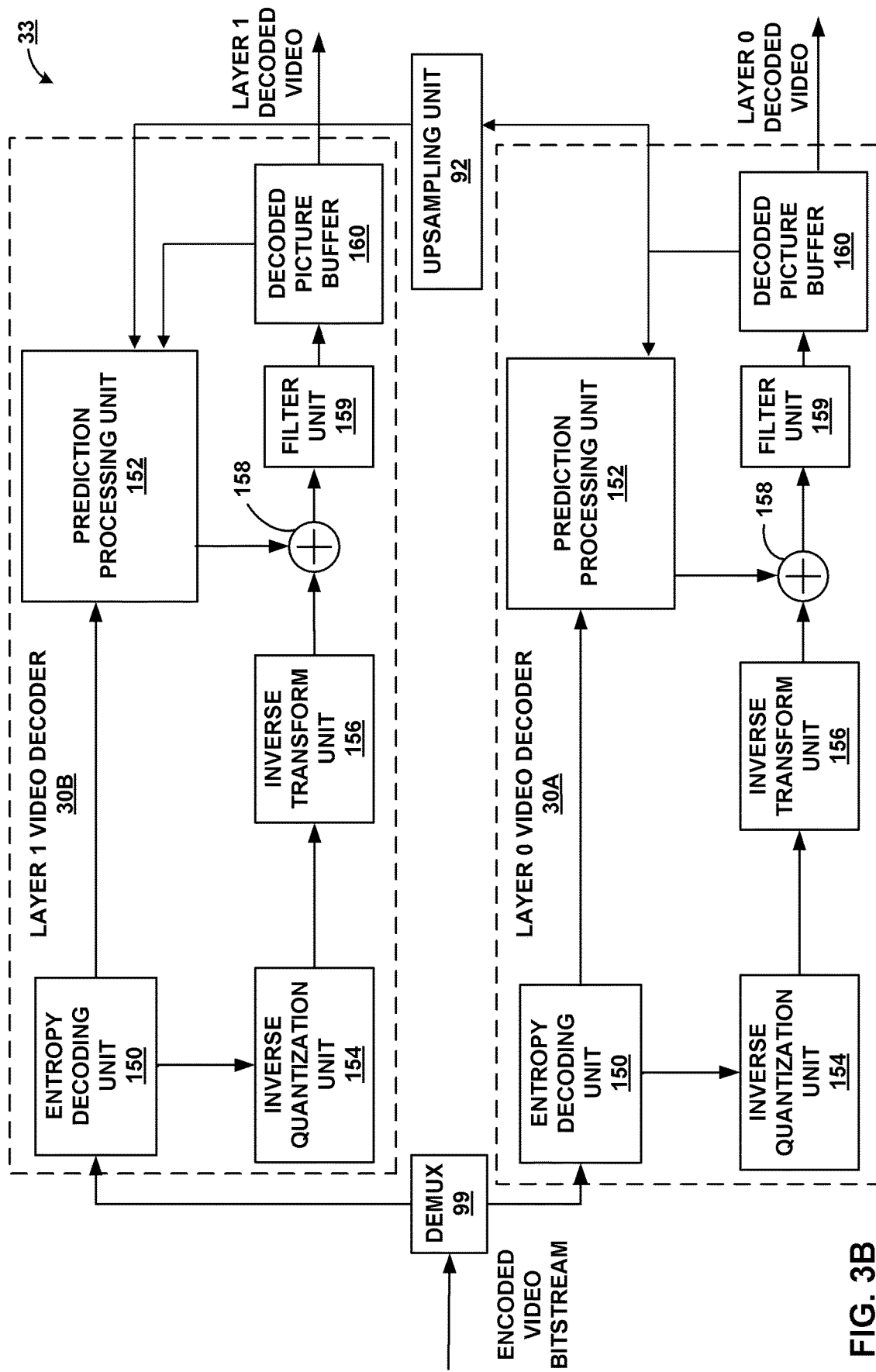
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor (or demux) 99. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in decoding order, except random access skipped leading (RASL) pictures, can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (IRAP) pictures. For example, a random access point associated with an enhancement layer IRAP picture in an enhancement layer ("layerA") that is contained in an access unit ("auA") may provide layer-specific random access such that for each reference layer ("layerB") of layerA (e.g., a reference layer being a layer that is used to predict layerA) having a random access point associated with a picture contained in an access unit ("auB") that is in layerB and precedes auA in decoding order (or a random access point contained in auA), the pictures in layerA that follow auA in decoding order (including those pictures located in auA), are correctly decodable without needing to decode any pictures in layerA that precede auA.

IRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as RASL pictures. Another type of picture that can follow an IRAP picture in decoding order and precede the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer ID value of 0) that is an IRAP picture may be referred to as an IRAP access unit.

Recovery Point SEI Messages

In some video coding schemes, it may be possible to start decoding the bitstream between IRAP pictures. This may enable a faster return to the decoded video stream when, for example, a portion of the bitstream is lost during transmission or during decoding, or for faster initiation of the decoding a live-streaming video. However, when initiating the decoding of a video stream at a random access point between IRAP pictures, the decoded video stream may not have an acceptable quality for display due to the reliance of the decoding process on pictures that precede the random access point in decoding order.

As previously mentioned, some video coding schemes include a recovery point SEI message which may assist a decoder in the determination of when the decoding process will produce acceptable pictures for display. When the decoder initiates a random access or reinitiates decoding after a broken link, the decoder may be able to determine when the decoded pictures are acceptable for display based on a recovery point SEI message included in the bitstream. The recovery point SEI message specifies a recovery point in the decoded picture output order which indicates that, when the decoding processes is initiated from the access unit containing the recovery point SEI message, all decoded pictures decoded at or subsequent to the recovery point in output order are correct or approximately correct in content. Such recovery point SEI messages do not require that the decoded pictures produced based on the decoding of the bitstream after a random access and/or before the picture associated with the recovery point are correct in order for the pictures decoded after the recovery point to have correct or approximately correct decoded content. Further, recovery point SEI messages do not require that pictures that are referenced by the decoding of the bitstream after a random access and/or before the picture associated with the recovery point are available.

In conventional single-layer coding schemes (e.g., HEVC Version 1), each access unit uniquely contains a single picture. Since each access unit contains a single picture, the terms "access unit" and "picture" were able to be used interchangeably in the context of single-layer coding schemes, for example, with respect to the utilization of recovery point SEI messages. However, the access units of multi-layer coding schemes may include a separate picture for each layer of the bitstream. In other words, in a multi-layer bitstream, a single access unit may contain (i.e., include or comprise) a plurality of pictures. Since in conventional single-layer coding schemes recovery point SEI messages are associated with an access unit, these single-layer coding schemes do not have the required semantics to define how a recovery point SEI message accurately relates to one or more pictures among a possible plurality of pictures within an access unit of a multi-layer coding scheme. This ambiguity relating to recovery point SEI messages in conventional schemes allows implementations of video encoders or decoders to associate the recovery point SEI messages with the pictures from among the possible plurality of pictures within an access unit of a multi-layer coding scheme without restriction. Accordingly, the behavior of these video encoders and decoders with respect to recovery point SEI messages is not predictable and may vary between different implementations such that these different implementations may not encode/decode a video sequence consistently. As such, one object of the present disclosure is to clarify the semantics of recovery point SEI messages such that a recovery point SEI message can be unambiguously associated with one or more pictures of an access unit within a multi-layer coding scheme.

In accordance with the present disclosure, a recovery point SEI message may be associated with and/or apply to one or more pictures of an access unit. This technique clarifies/modifies the semantics of recovery point SEI messages such that recovery point SEI messages can be unambiguously associated with a specific picture(s) of an access unit within a multi-layer coding scheme. By clarifying the semantics in accordance with the present disclosure, the behavior of video encoders/decoders is more predictable, and thus, the treatment of recovery point SEI messages between different implementations of these video encoders/decoders is more consistent than in the conventional coding schemes. The techniques/schemes of the present disclosure are "backward" compatible or "downward" compatible such that the techniques/schemes of the present disclosure may be employed by legacy devices employing single-layer video coding schemes. Further, the techniques/schemes of the present disclosure may be utilized with other types of SEI messages that may be applied to pictures from more than one layer within a multi-layer bitstream. Various associations between recovery point SEI messages and the pictures of a multi-layer bitstream will be described in greater detail with reference to FIGS. 4-6.

Figure 4:
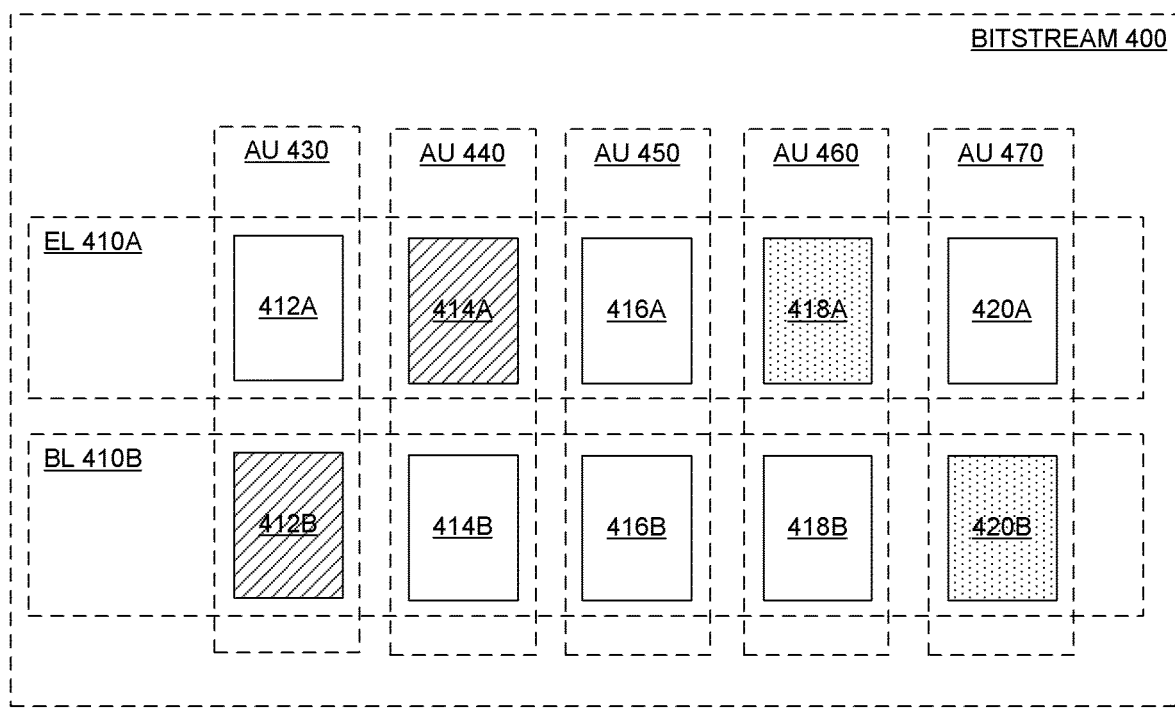
FIG. 4 is a block diagram illustrating the association between recovery point SEI messages and the pictures of a multi-layer bitstream in accordance with aspects described in this disclosure.

FIG. 4 is a block diagram illustrating the association between recovery point SEI messages and pictures of a multi-layer bitstream according to an embodiment of the present disclosure. FIG. 4 includes a scalable video encoded bitstream 400 (also referred to simply as bitstream 400) having a base layer (BL) 410B and an enhancement layer (EL) 410A. Although the bitstream 400 of FIG. 4 is illustrated as containing base layer 410B and enhancement layer 410A, the bitstream 400 may further include one or more additional enhancement layers or, when the bitstream is multiview video encoded bitstream, each of the layers may constitute a different view. One example of a multiview bitstream is a three-dimensional (3D) video bitstream including a left eye view layer and a right eye view layer.

Referring back to FIG. 4, the bitstream 400 includes a plurality of access units (AUs) 430 to 470. Each access unit includes a picture from the base layer 410B and a picture from the enhancement layer 410A. For example, AU 430 includes BL picture 412B and EL picture 412A, respectively included in the base layer 410B and the enhancement layer 410A. In the embodiment of FIG. 4, AU 430 and AU 440 each include a recovery point SEI message. In AU 430, the recovery point SEI message is associated with BL picture 412B and the recovery point SEI message of AU 440 is associated with EL picture 414A. The "association" of the recovery point SEI messages is illustrated using diagonal hatching markings in FIG. 4.

Figure 5:
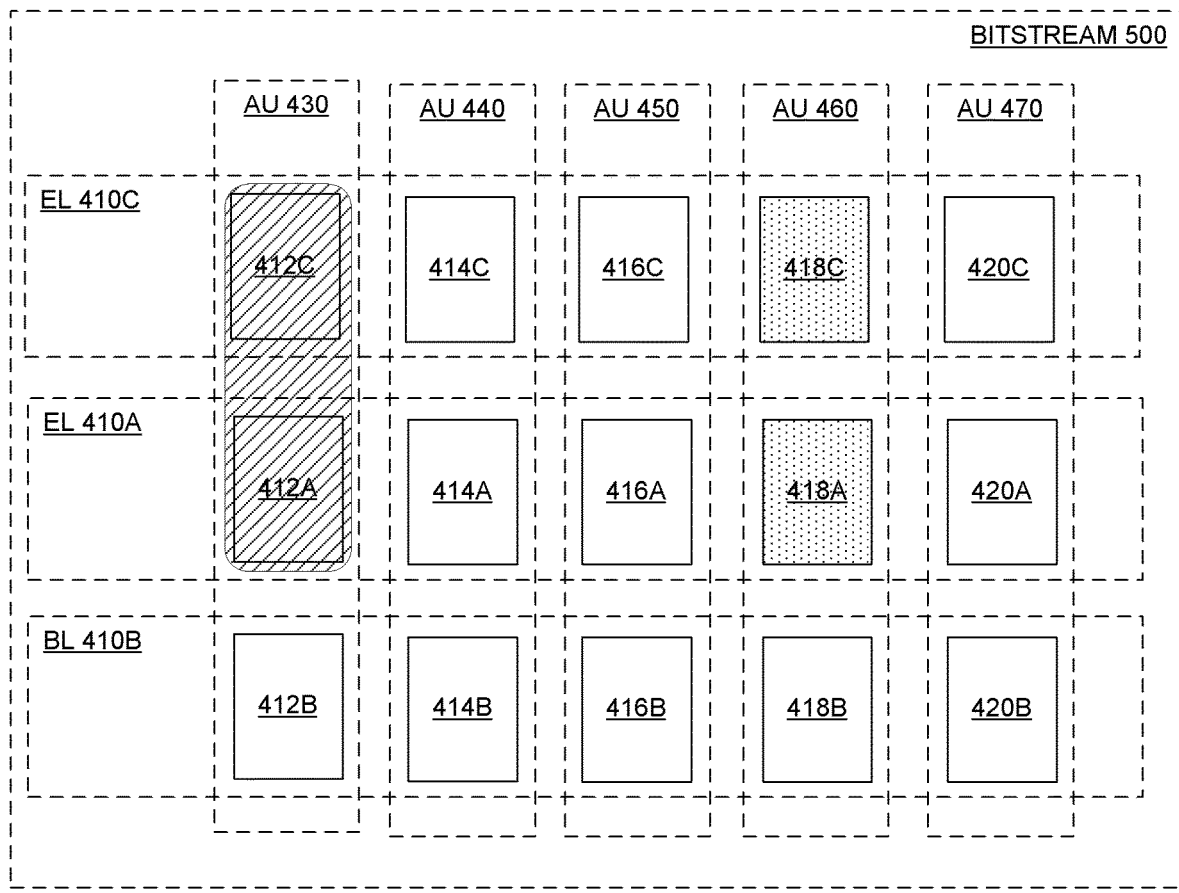
FIG. 5 is a block diagram illustrating the association between a recovery point SEI message and a plurality of pictures in accordance with aspects described in this disclosure.
Figure 6:
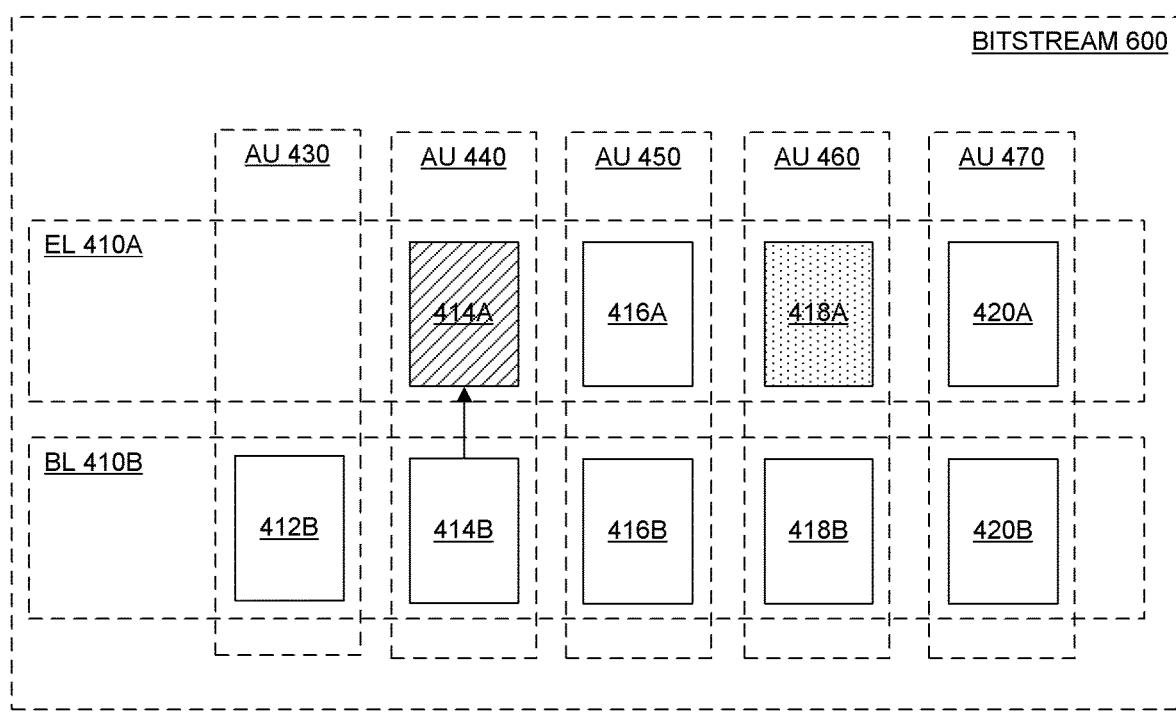
FIG. 6 is a block diagram illustrating the association between a recovery point SEI message and a picture of a dependent layer in accordance with aspects described in this disclosure.

The recovery point SEI messages illustrated in FIG. 4 indicate recovery points for their respective layers. A recovery point generally refers to an indication of the picture in the bitstream at which decoding of the bitstream will be correct or approximately correct in content after beginning decoding at a random access point prior to or at the picture associated with the recovery point SEI message. In FIGS. 4-6, recovery points are indicated by dotted hatching and the recovery point SEI messages are indicated by cross-hatching. For example, the recovery point SEI message associated with BL picture 412B indicates a recovery point at BL picture 420B, i.e., if decoding begins at a random access point within the base layer 410B before or at BL picture 412B, the decoding of the base layer 410B will be correct or approximately correct in content after BL picture 420B is decoded. Similarly, EL picture 418A is the recovery point indicated by the recovery point SEI message associated with EL picture 414A. In other words, if decoding begins at a random access point within the enhancement layer 410A before or at EL picture 414A, the decoding of the enhancement layer 410A will be correct or approximately correct in content after EL picture 418A is decoded.

As described in connection with the embodiment of FIG. 4, in accordance with the present disclosure, a recovery point SEI message for a multi-layer bitstream may be individually associated with a single picture in any layer of the multi-layer bitstream. Additionally, a plurality of recovery point SEI messages may be respectively associated with each or a subset of a plurality of pictures of the same access unit. For example, although not illustrated in FIG. 4, each of the BL picture 416B and the EL picture 416A associated with AU 450 may be associated with separate recovery point SEI messages.

FIG. 5 is a block diagram illustrating the association between a recovery point SEI message and a plurality of pictures according to an embodiment of the present disclosure. The multi-layer bitstream 500 (also referred to simply as bitstream 500) of FIG. 5 is similar to that of FIG. 4 except for the inclusion of an additional enhancement layer 410C. Accordingly, each AU 430 to 470 includes one picture from each layer. For example, AU 460 includes BL picture 418B, EL picture 418A, and EL picture 418C.

In the embodiment illustrated in FIG. 5, AU 430 includes a single recovery point SEI message which is associated with both EL picture 412A and EL picture 412C. When a recovery point SEI message is associated with more than one picture as depicted in FIG. 5, the recovery point SEI message may be implemented as a scalable nesting SEI message. The scalable nesting recovery point SEI message is illustrated in FIG. 5 by the hatched area within AU 430.

The scalable nesting recovery point SEI message associated with EL picture 412A and EL picture 412C indicates a recovery point at EL picture 418A and EL picture 418C. In this embodiment, the scalable nesting recovery point SEI message uniquely indicates a single recovery point for the EL picture 412A and the EL picture 412C associated with the SEI message. The recovery point indicated by a scalable nesting recovery point SEI message is the point at which all of the pictures included in the layers of the pictures associated with the recovery point SEI message will be correct or approximately correct in decoded content. Accordingly, one or more of the decoded pictures may be correct or approximately correct in content prior to the recovery point of the scalable nesting recovery point SEI message.

FIG. 6 is a block diagram illustrating the association between a recovery point SEI message and a picture of a dependent layer (i.e., a layer of according to an embodiment of the present disclosure). The multi-layer bitstream 600 (also referred to simply as bitstream 600) illustrated in FIG. 6 is similar to that illustrated in FIG. 4. However, in this embodiment, the enhancement layer 410A of the bitstream 600 is dependent upon the base layer 410B. Since the enhancement layer 410A is dependent upon the base layer 410B, the enhancement layer 410A is not independently decodable and requires at least a portion of the base layer 410B in order to be correctly decoded.

In certain embodiments, a video decoder (e.g., the video decoder 30 or 33) may not receive (or may not be able to accurately process) the enhancement layer 410A and thus only decodes the received base layer 410B. This may occur, for example, when the bandwidth between a video encoder (e.g., the video encoder 20 or the video encoder 23) and a video decoder (e.g., the video decoder 30 or the video decoder 33) is limited, the enhancement layer 410A, for example, may be dropped from the bitstream 600 in order to conserve bandwidth. Thereafter, when the available bandwidth increases, the enhancement layer 410A may be received (or accurately processed) by the video decoder. The video decoder may then attempt to initiate decoding of the enhancement layer 410A at a random access point between pictures indicating the possible start of recovery. In FIG. 6 this is illustrated by the inclusion of EL picture 414A which has an associated recovery point SEI message.

As described above, in some embodiments the enhancement layer 410A is dependent upon the base layer 410B. In these embodiments, in order for the recovery point (shown at EL picture 418A) indicated by the recovery point SEI message of EL picture 414A to be accurate, the base layer 410B should be correctly or approximately correctly decoded by BL picture 414B. Thus, the independent layer should be correctly or approximately correctly decoded prior to or at the same picture included in the same access unit as the picture of the dependent layer to be associated with the recovery point SEI message before associating the picture of the dependent layer with the recovery point SEI message. In some implementations, determining whether the independent layer picture is correctly or approximately correctly decoded includes determining whether the independent layer picture is known to be within a defined range for correct decoding of the independent layer picture.

In some embodiments of the present disclosure, the recovery point SEI message may contain a flag which indicates whether the content of the decoded picture of the recovery point is an exact match with the content of a correctly decoded picture. This exact match flag indicates to the decoder whether the picture at the recovery point will be either correct or approximately correct in content. The content of a decoded picture is correct in content when the decoded picture is decoded after an IRAP picture in decoding order and there are no decoding errors or loss of information there between. The content of a decoded picture may be determined to be approximately correct when the content of the decoded picture is within a defined range of the content of the correctly decoded picture, i.e., the picture that would have been decoded starting from an IRAP picture prior to the access unit containing the recovery point SEI message.

Region Refresh Information SEI Messages

Some video coding schemes further include region refresh information SEI messages (also referred to as region refresh SEI messages). A region refresh SEI message, which is associated with a recovery point SEI message, indicates whether regions (e.g., slice segments) of a current picture, that the current region refresh SEI message applies/corresponds to, belong to a refreshed region (or a non-refreshed region) of the current picture. In other words, a region refresh SEI includes information that indicates whether individual slices of a corresponding picture are correct or approximately correct in content after decoding.

As described above, in conventional video coding schemes an access unit is uniquely associated with a picture. As such, in these conventional schemes, region refresh information SEI messages are associated with an access unit, and thus, uniquely associated with a picture. However, in multi-layer coding schemes an access unit may contain more than one picture. As such, the semantics of conventional video coding schemes do not necessarily allow for an association between a region refresh information SEI message and one picture among a plurality of pictures included in an access unit. Accordingly, another object of the present disclosure is to clarify the semantics of region refresh information SEI messages such that one region refresh information SEI message is uniquely associated with one picture.

Figure 7:
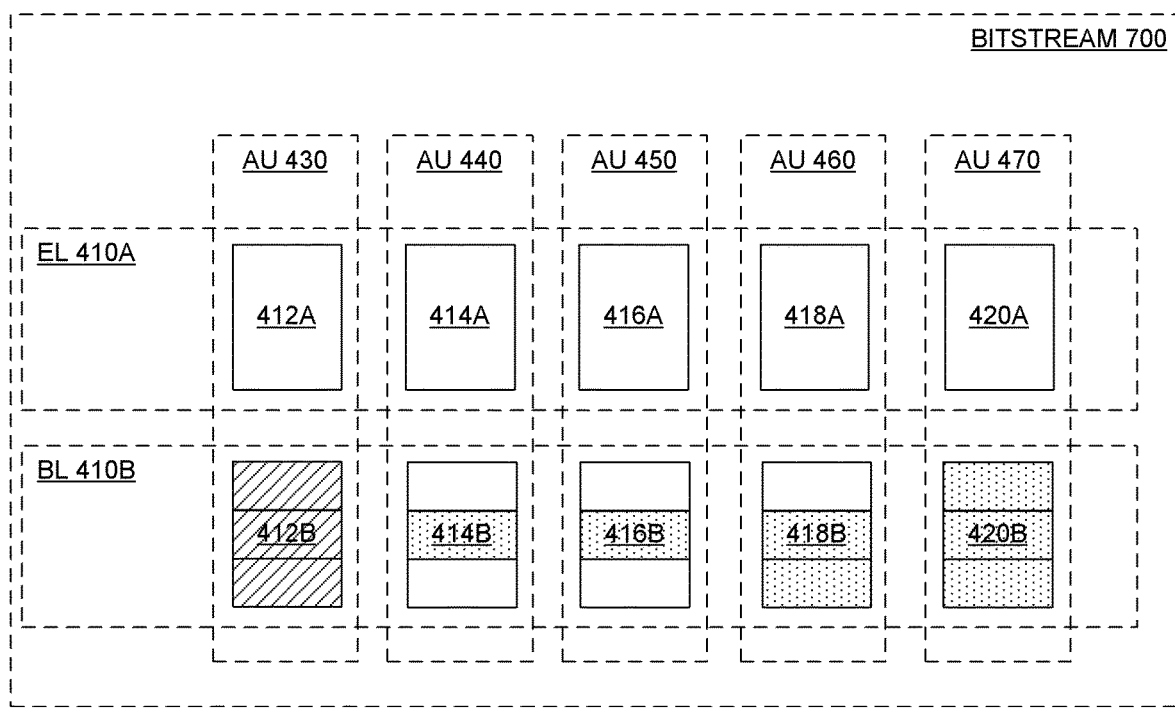
FIG. 7 is a block diagram illustrating the association between a region refresh information SEI message and the pictures of a multi-layer bitstream in accordance with aspects described in this disclosure.

FIG. 7 is a block diagram illustrating the association between one or more region refresh SEI messages and one or more pictures of a multi-layer bitstream according to an embodiment of the present disclosure. FIG. 7 includes a multi-layer bitstream 700 (also referred to simply as bitstream 700) which is similar to the bitstream 400 described in connection with FIG. 4. Here, a recovery point SEI message is associated with BL picture 412B and the corresponding recovery point is associated with BL picture 420B. In FIG. 7, the cross-hatching indicates that the corresponding picture (i.e., BL picture 412B) is associated with a recovery point SEI message and one or more region refresh SEI messages. A plurality of pictures following and in a same layer as a picture associated with a recovery point SEI message may be generally referred to as gradual decoding refresh (GDR) pictures. A GDR picture may be associated with a GDR picture set that includes pictures starting from the picture associated with the recovery point SEI message to the last picture in the GDR picture set in output order. The GDR picture set is associated with a corresponding recovery point SEI message. Further, a region refresh SEI message may be associated with a GDR picture. In FIG. 7, each of BL pictures 412B to 420B in the base layer 410B is illustrated as including three separate slices of content, however, the number of slices included in each picture of the bitstream 700 may be varied according to different aspects of the particular embodiment. In some implementations of the present disclosure, a region refresh SEI message is only associated with a picture when the picture is included in a GDR picture set. The slices of the BL pictures 412B to 420B in the base layer 410B will be referred to as top, middle, and bottom slices herein to refer to the corresponding slices based on their orientation in the figure.

The region refresh SEI message of BL picture 414B of FIG. 7 indicates that the middle slice of the BL picture 414B will be correct or approximately correct in decoded content by BL picture 414B as illustrated by the dotted hatching. Similarly, the region refresh SEI message of BL picture 418B indicates that the corresponding bottom slice (i.e., the bottom slice of BL picture 418B) will be correct or approximately correct in content by BL picture 418B. Similarly, the region refresh SEI message of BL picture 420B indicates that the top slice of BL picture 420B will be correct or approximately correct in content by BL picture 420B. As such, the region refresh information SEI messages includes information further defining when each of the slices in the associated picture will be correct or approximately correct in decoded content when random access begins at or prior to a picture associated with the corresponding recovery point SEI message (e.g. the picture associated with the recovery point SEI message that is associated with the GDR picture set).

As described above and illustrated in FIG. 7, a region refresh information SEI message includes information relating to individual slices of a picture. In order to unambiguously associate the region refresh information SEI message with a picture in a multi-layer coding scheme, the region refresh information SEI message is associated with a single picture. Accordingly, in multi-layer bitstreams such as bitstream 700, a region refresh information SEI message is uniquely associated with a picture of the bitstream in contrast to conventional coding schemes where a region refresh information SEI message was associated with an access unit.

Figure 8:
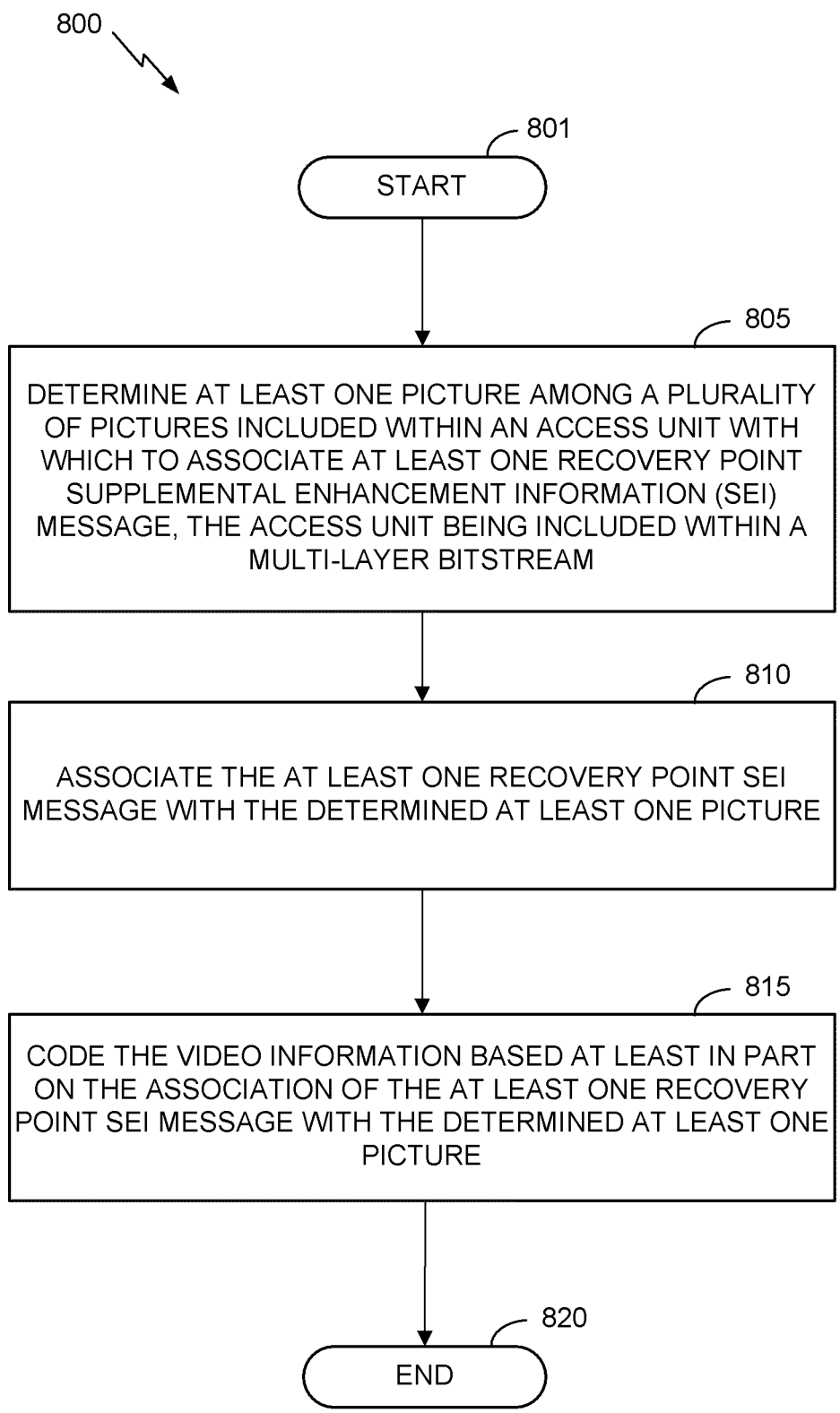
FIG. 8 is a flowchart illustrating a method 800 for encoding video information in accordance with aspects described in this disclosure.

Example Flowchart for Associating a Recovery Point SEI Message with One or More Pictures of an Access Unit With reference to FIG. 8, an example procedure for associating a recovery point SEI message with one or more pictures of an access unit will be described. FIG. 8 is a flowchart illustrating a method 800 for coding video information, according to an embodiment of the present disclosure. The steps illustrated in FIG. 8 may be performed by a video encoder (e.g., the video encoder 20 or the video encoder 23) a video decoder (e.g., the video decoder 30 of the video decoder 33), or any other component. For convenience, method 800 is described as performed by a video coder (also simply referred to as coder), which may be the video encoder 20 or 23, the video decoder 30 or 33, or another component.

The method 800 begins at block 801. At block 805, the coder determines at least one picture among a plurality of pictures included within an access unit with which to associate at least one recovery point supplemental enhancement information (SEI) message, the access unit being included within a multi-layer bitstream. Each of the plurality of pictures may be coded within a separate layer. For example, the layers may include a base layer and one or more enhancement layers or each layer may correspond to a separate view.

At block 810, the coder associates the at least one recovery point SEI message with the determined at least one picture. The association of the at least one recovery point SEI message with the determined at least one picture may be performed in response to determining to associate the at least one recovery point SEI message with any of a plurality of pictures included in the access unit. At block 815, the coder codes the video information based at least in part on the association of the at least one recovery point SEI message with the determined at least one picture. The method ends at 820.

In the method 800, one or more of the blocks shown in FIG. 8 may be removed (e.g., not performed) and/or the order in which the method is performed may be switched. In some embodiments, additional blocks may be added to the method 800. The embodiments of the present disclosure are not limited to or by the example shown in FIG. 8, and other variations may be implemented without departing from the spirit of this disclosure.

Example Implementation(s)

Some embodiments of the present disclosure are summarized and described below. When certain portions of the HEVC specification are reproduced to illustrate the additions and deletions that may be incorporated to implement one or more of the methods described herein, such modifications are shown in italics and strikethrough, respectively.

Recovery Point SEI Messages

In some implementations of the present disclosure, recovery point SEI messages are modified as described below.

TABLE 1

Recovery point SEI message semantics modifications
Modification to semantics of recovery point SEI message The semantics below apply independently to each particular layer with nuh_layer_id equal to targetLayerId of the layers to which the recovery point SEI message applies. The current picture refers to the picture with nuh_layer_id equal to targetLayerId in the access unit containing the current SEI message.
NOTE 1 - If not nested, a recovery point SEI message applies to the layer for which the VCL NAL units have nuh_layer_id equal to the nuh_layer_id of the SEI NAL unit containing the SEI message. Otherwise, the layers to which a recovery point SEI message applies are specified by the scalable nesting SEI message that contains the SEI message.
The recovery point SEI message assists a decoder in determining when the decoding process will produce acceptable pictures with nuh_layer_id equal to targetLayerId for display after the decoder initiates random access or after the encoder indicates a broken link ~~in the CVS~~.
When the decoding process is started with the access unit in decoding order containing ~~associated with~~ the recovery point SEI message, all decoded pictures with nuh_layer_id equal to targetLayerId at or subsequent to the recovery point in output order specified in this SEI message are indicated to be correct or approximately correct in content. Decoded pictures with nuh_layer_id equal to targetLayerId produced by random access at or before the ~~picture associated with~~ access unit containing the recovery point SEI message need not be correct in content until the indicated recovery point, and the operation of the decoding process starting at the access unit containing the recovery point SEI message may contain references to pictures unavailable in the decoded picture buffer.
In addition, by use of the broken_link_flag, the recovery point SEI message can indicate to the decoder the location of some pictures with nuh_layer_id equal to targetLayerId in the bitstream that can result in serious visual artefacts when displayed, even when the decoding process was begun at the location of a previous access unit containing an IRAP picture with nuh_layer_id equal to targetLayerId ~~access unit~~ in decoding order.
NOTE ~~1~~ 2 - The broken_link_flag can be used by encoders to indicate the location of a point after which the decoding process for the decoding of some pictures with nuh_layer_id equal to targetLayerId may cause references to pictures that, though available for use in the decoding process, are not the pictures that were used for reference when the bitstream was originally encoded (e.g. due to a splicing operation performed during the generation of the bitstream). When random access is performed to start decoding from the access unit containing ~~associated with~~ the recovery point SEI message, the decoder operates as if the associated access unit was the first ~~picture~~ access unit in the bitstream in decoding order, and the variables prevPicOrderCntLsb and prevPicOrderCntMsb used in derivation of PicOrderCntVal for each picture in the access unit are both set equal to 0.
NOTE ~~2~~ 3 - When HRD information is present in the bitstream, a buffering period SEI message should be associated with the access unit associated with the recovery point SEI message in order to establish initialization of the HRD buffer model after a random access.
Any SPS or PPS RBSP that is referred to by a picture of the access unit containing ~~associated with~~ a recovery point SEI message or by any picture in a subsequent access unit ~~following such a picture~~ in decoding order shall be available to the decoding process prior to its activation, regardless of whether or not the decoding process is started at the beginning of the bitstream or with the access unit, in decoding order, that is ~~associated with~~ contains the recovery point SEI message.

TABLE 1-continued

Recovery point SEI message semantics modifications
Modification to semantics of recovery point SEI message recovery_poc_cnt specifies the recovery point of decoded pictures with nuh_layer_id equal to targetLayerId in output order. If there is a picture picA with nuh_layer_id equal to targetLayerId that follows the current picture but precedes an access unit containing an IRAP picture with nuh_layer_id equal to targetLayerId in decoding order ~~in the CVS~~ and that has PicOrderCntVal equal to the PicOrderCntVal of the current picture ~~(i.e., the picture associated with the current SEI message)~~ plus the value of recovery_poc_cnt, the picture picA is referred to as the recovery point picture. Otherwise, the first picture with nuh_layer_id equal to targetLayerId in output order that has PicOrderCntVal greater than the PicOrderCntVal of the current picture plus the value of recovery_poc_cnt is referred to as the recovery point picture. The recovery point picture shall not precede the current picture in decoding order. All decoded pictures with nuh_layer_id equal to targetLayerId in output order are indicated to be correct or approximately correct in content starting at the output order position of the recovery point picture. The value of recovery_poc_cnt shall be in the range of -MaxPicOrderCntLsb/2 to MaxPicOrderCntLsb/2 - 1, inclusive.
exact_match_flag indicates whether decoded pictures with nuh_layer_id equal to targetLayerId at and subsequent to the specified recovery point in output order derived by starting the decoding process at the access unit containing ~~associated with~~ the recovery point SEI message will be an exact match to the pictures with nuh_layer_id equal to targetLayerId that would be produced by starting the decoding process at the location of a previous access unit where the picture of the layer with nuh_layer_id equal to targetLayerId and the pictures of all the direct and indirect reference layers are IRAP pictures ~~access unit~~, if any, in the bitstream. The value 0 indicates that the match may not be exact and the value 1 indicates that the match will be exact. When exact_match_flag is equal to 1, it is a requirement of bitstream conformance that the decoded pictures with nuh_layer_id equal to targetLayerId at and subsequent to the specified recovery point in output order derived by starting the decoding process at the access unit containing ~~associated with~~ the recovery point SEI message shall be an exact match to the pictures with nuh_layer_id equal to targetLayerId that would be produced by starting the decoding process at the location of a previous access unit where the picture of the layer with nuh_layer_id equal to targetLayerId and the pictures of all the direct and indirect reference layers are IRAP pictures ~~access unit~~, if any, in the bitstream.
NOTE 4 - When performing random access, decoders should infer all references to unavailable pictures as references to pictures containing only intra coding blocks and having sample values given by Y equal to ( 1 << ( BitDepth$_Y$ - 1 ) ), Cb and Cr both equal to ( 1 << ( BitDepth$_C$ - 1 ) ) (mid-level grey), regardless of the value of exact_match_flag.
When exact_match_flag is equal to 0, the quality of the approximation at the recovery point is chosen by the encoding process and is not specified in this Specification.
broken_link_flag indicates the presence or absence of a broken link in the layer ~~NAL unit stream~~ with nuh_layer_id equal to targetLayerId at the location of the recovery point SEI message and is assigned further semantics as follows:
If broken_link_flag is equal to 1, pictures with nuh_layer_id equal to targetLayerId produced by starting the decoding process at the location of a previous access unit where the picture of the layer with nuh_layer_id equal to targetLayerId and the pictures of all the direct and indirect reference layers are IRAP pictures ~~access unit~~, may contain undesirable visual artefacts to the extent that decoded pictures with nuh_layer_id equal to targetLayerId at and subsequent to the access unit containing ~~associated with~~ the recovery point SEI message in decoding order should not be displayed until the specified recovery point in output order.
Otherwise (broken_link_flag is equal to 0), no indication is given regarding any potential presence of visual artefacts.
When the current picture is a BLA picture, the value of broken_link_flag shall be equal to 1.
Regardless of the value of the broken_link_flag, pictures with nuh_layer_id equal to targetLayerId subsequent to the specified recovery point in output order are specified to be correct or approximately correct in content.

Region Refresh Information SEI Messages

In some implementations of the present disclosure, region refresh information SEI messages are modified as described below.

TABLE 2

Region refresh information SEI message semantics modifications
Modification to semantics of region refresh information SEI message The region refresh information SEI message indicates whether the slice segments that the current SEI message applies to belong to a refreshed region of the current picture ~~(as defined below)~~. The current picture is the picture that contains the first VCL NAL unit that follows the region refresh information SEI message in decoding order.
A region refresh information SEI message shall not be nested.
~~An access unit~~ A picture that is not an IRAP picture access unit for which the containing access unit contains ~~and that contains~~ a recovery point SEI message that applies to the layer containing the picture is referred to as a gradual decoding refresh (GDR) picture ~~access unit and its corresponding picture is referred to as a GDR picture~~. The access unit containing the GDR picture is referred to as the GDR access unit, and the access unit containing TABLE 2-continued Region refresh information SEI message semantics modifications
Modification to semantics of region refresh information SEI message ~~corresponing to~~ the indicated recovery point picture is referred to as the recovery point access unit
If there is a picture that follows the GDR picture but precedes an access unit containing an IRAP picture in decoding order ~~in the CVS~~, that belongs to the same layer as the GDR picture, and that has PicOrderCntVal equal to the PicOrderCntVal of the GDR picture plus the value of recovery_poc_cnt in the recovery point SEI message, let the variable lastPicInSet be the recovery point picture. Otherwise, let lastPicInSet be the picture that belongs to the same layer as the GDR picture and that immediately precedes the recovery point picture in output order. The picture lastPicInSet shall not precede the GDR picture in decoding order. For a GDR picture, let gdrPicSet be the set of pictures in the same layer as the GDR picture starting from a GDR picture to the picture lastPicInSet, inclusive, in output order. When the decoding process is started from a GDR access unit, the refreshed region in each picture of the gdrPicSet is indicated to be the region of the picture that is correct or approximately correct in content, and, when lastPicInSet is the recovery point picture, the refreshed region in lastPicInSet covers the entire picture.
The slice segments to which a region refresh information SEI message applies consist of all slice segments that are within the current picture and ~~access unit~~ that follow the SEI NAL unit containing the region refresh information SEI message and precede the next SEI NAL unit containing a region refresh information SEI message (if any) in decoding order. These slice segments are referred to as the slice segments associated with the region refresh information SEI message.
Let gdrAuSet be the set of access units containing the pictures corresponding to gdrPicSet. A gdrAuSet and the corresponding gdrPicSet are referred to as being associated with the recovery point SEI message contained in the GDR access unit.
Region refresh information SEI messages shall not be present for a picture ~~in an access unit~~ unless the ~~access unit~~ picture is included in a ~~gdrAuSet~~ gdrPicSet associated with a recovery point SEI message. When any ~~access unit~~ picture that is included in a ~~gdrAuSet~~ gdrPicSet ~~contains~~ is associated with one or more region refresh information SEI messages, all ~~access unit~~ pictures in the gdrPicSet shall be associated with ~~gdrAuSet shall contain~~ one or more region refresh information SEI messages.
refreshed_region_flag equal to 1 indicates that the slice segments associated with the current SEI message belong to the refreshed region in the current picture. refreshed_region_flag equal to 0 indicates that the slice segments associated with the current SEI message may not belong to the refreshed region in the current picture.
When one or more region refresh information SEI messages are present and associated with a picture ~~in an access unit~~ and the first slice segment of the ~~access unit~~ picture in decoding order does not have an associated region refresh information SEI message, the value of refreshed_region_flag for the slice segments that precede the first region refresh information SEI message is inferred to be equal to 0.
When lastPicInSet is the recovery point picture, and any region refresh SEI message is ~~included in~~ associated with a recovery point picture ~~access unit~~, the first slice segment of the picture ~~access unit~~ in decoding order shall have an associated region refresh SEI message, and the value of refreshed_region_flag shall be equal to 1 in all region refresh SEI messages in the picture ~~access unit~~.
When one or more region refresh information SEI messages are associated with a picture ~~present in an access unit~~, the refreshed region in the picture is specified as the set of CTUs in all slice segments of the picture ~~access unit~~ that are associated with region refresh information SEI messages that have refreshed_region_flag equal to 1. Other slice segments belong to the non-refreshed region of the picture.
It is a requirement of bitstream conformance that when a dependent slice segment belongs to the refreshed region, the preceding slice segment in decoding order shall also belong to the refreshed region.
Let gdrRefreshedSliceSegmentSet be the set of all slice segments that belong to the refreshed regions in the gdrPicSet. When a gdrPicSet ~~gdrAuSet~~ contains one or more pictures associated with region refresh information SEI messages, it is a requirement of bitstream conformance that the following constraints all apply:
The refreshed region in the first picture included in the corresponding gdrPicSet in decoding order that contains any refreshed region shall contain only coding units that are coded in an intra coding mode.
For each picture included in the gdrPicSet, the syntax elements in gdrRefreshedSliceSegmentSet shall be
constrained such that no samples or motion vector values outside of gdrRefreshedSliceSegmentSet are used for inter prediction in the decoding process of any samples within gdrRefreshedSliceSegmentSet.
For any picture that follows the picture lastPicInSet in output order, the syntax elements in the slice segments of the picture shall be constrained such that no samples or motion vector values outside of gdrRefreshedSliceSegmentSet are used for inter prediction in the decoding process of the picture other than those of the other pictures that follow the picture lastPicInSet in output order.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. For example, a scalable nesting recovery point SEI message may be associated with a plurality of pictures in one access unit and a single recovery point SEI message may additionally be associated with one of the pictures of the same access unit. The single recovery point SEI message may be associated with one of the same pictures that is associated with the scalable nesting recovery point SEI message or a different unassociated picture. Similar combinations of features are also contemplated including the addition of a region refresh information SEI message with a picture associated with a recovery point SEI message; however, the combinations of features between the respective embodiments are not necessarily limited thereto.

Various embodiments of the disclosure have been described. These and other embodiments are within the scope of the following claims.

What is claimed is:

1. A method for coding video information of a multi-layer bitstream, comprising: determining at least one picture among a plurality of pictures included within an access unit with which to associate at least one recovery point supplemental enhancement information (SEI) message, each of the plurality of pictures of the access unit being included within different layers of the multi-layer bitstream; associating the at least one recovery point SEI message with more than one picture included in the access unit, the at least one recovery point SEI message contained by a scalable nesting SEI message and being indicative of a recovery point in which all pictures included in layers of the multi-layer bitstream associated with the recovery point SEI message will be correct in decoded content; identifying a first picture from the more than one picture associated with the recovery point SEI message with which to associate a first region refresh SEI message, wherein the first region refresh SEI message indicates whether regions of the first picture to which the first region refresh SEI message applies belong to a refreshed region of the first picture; associating the first region refresh SEI message with the first picture, the first region refresh SEI message being indicative of whether individual slices of the first picture is correct in content after decoding; and coding the video information based at least in part on the association of the at least one recovery point SEI message with the more than one picture and the association of the first region refresh SEI message with the first picture.

2. The method of claim 1, wherein the associating the at least one recovery point SEI message with the more than one picture comprises: associating a first recovery point SEI message with the first picture of the access unit; and associating a second recovery point SEI message with a second picture of the access unit.

3. The method of claim 1, wherein the access unit comprises the first picture in a first layer and a second picture in a second layer, the second layer being a dependent layer of the first layer, wherein the associating comprises: determining whether the first picture is known to be within a defined range for correct decoding of the first picture; and associating the at least one recovery point SEI message with the second picture in response to determining that the first picture is known to be within the defined range.

4. The method of claim 1, further comprising associating a second region refresh SEI message with another picture of the subset of the plurality of pictures associated with the at least one recovery point SEI message, wherein the second region refresh SEI message indicates whether regions of the other picture to which the second region refresh SEI message applies belong to a refreshed region of the other picture.

5. The method of claim 1, wherein the at least one recovery point SEI message comprises an indication of a recovery point picture and an exact match flag, the method further comprising: determining whether decoding of the video information beginning at the access unit would result in the same recovery point picture as decoding the video information beginning at an intra random access point (IRAP) picture; and setting the exact match flag to indicate that the decoding of the video information would result in the same recovery point picture in response to determining that the decoding of the video information would result in the same recovery point picture.

6. A device for coding video information of a multi-layer bitstream, comprising: a memory configured to store the video information; and a processor implemented in circuitry and in communication with the memory, the processor configured to: determine at least one picture among a plurality of pictures included within an access unit with which to associate at least one recovery point supplemental enhancement information (SEI) message, each of the plurality of pictures of the access unit being included within different layers of the multi-layer bitstream; associate the at least one recovery point SEI message with more than one picture included in the access unit, the at least one recovery point SEI message being contained by a scalable nesting SEI message and being indicative of a recovery point in which all pictures included in layers of the multi-layer bitstream associated with the recovery point SEI message will be correct in decoded content; identify a first picture from the more than one picture associated with the recovery point SEI message with which to associate a first region refresh SEI message, wherein the first region refresh SEI message indicates whether regions of the first picture to which the first region refresh SEI message applies belong to a refreshed region of the first picture; associate the first region refresh SEI message with the first picture, the first region refresh SEI message being indicative of whether individual slices of the first picture is correct in content after decoding; and code the video information based at least in part on the association of the at least one recovery point SEI message with the more than one picture and the association of the first region refresh SEI message with the first picture.

7. The device of claim 6, wherein the processor is further configured to: associate a first recovery point SEI message with the first picture of the access unit; and associate a second recovery point SEI message with a second picture of the access unit.

8. The device of claim 6, wherein the access unit comprises the first picture in a first layer and a second picture in a second layer, the second layer being a dependent layer of the first layer, wherein the processor is further configured to: determine whether the first picture is known to be within a defined range for correct decoding of the first picture; and associate the at least one recovery point SEI message with the second picture in response to the determination that the first picture is known to be within the defined range.

9. The device of claim 6, wherein the processor is further configured to associate a second region refresh SEI message with another picture of the subset of the plurality of pictures associated with the at least one recovery point SEI message, wherein the second region refresh SEI message indicates whether regions of the other picture to which the second region refresh SEI message applies belong to a refreshed region of the other picture.

10. The device of claim 6, wherein the at least one recovery point SEI message comprises an indication of a recovery point picture and an exact match flag, and wherein the processor is further configured to: determine whether decoding of the video information beginning at the access unit would result in the same recovery point picture as decoding the video information beginning at an intra random access point (IRAP) picture; and set the exact match flag to indicate that the decoding of the video information would result in the same recovery point picture in response to determining that the decoding of the video information would result in the same recovery point picture.

11. An apparatus, comprising: means for determining at least one picture among a plurality of pictures included within an access unit with which to associate at least one recovery point supplemental enhancement information (SEI) message, each of the plurality of pictures of the access unit being included within different layers of a multi-layer bitstream; means for associating the at least one recovery point SEI message with more than one picture included in the access unit, the at least one recovery point SEI message being contained by a scalable nesting SEI message and being indicative of a recovery point in which all pictures included in layers of the multi-layer bitstream associated with the recovery point SET message will be correct in decoded content; means for identifying a first picture from the more than one picture associated with the recovery point SEI message with which to associate a first region refresh SEI message, wherein the first region refresh SEI message indicates whether regions of the first picture to which the first region refresh SEI message applies belong to a refreshed region of the first picture; means for associating the first region refresh SEI message with the first picture, the first region refresh SEI message being indicative of whether individual slices of the first picture is correct in content after decoding; and means for coding the video information based at least in part on the association of the at least one recovery point SET message with the more than one picture and the association of the first region refresh SEI message with the first picture.

12. The apparatus of claim 11, wherein the means for associating comprises: means for associating a first recovery point SEI message with the first picture of the access unit; and means for associating a second recovery point SEI message with a second picture of the access unit.

13. The apparatus of claim 11, wherein the access unit comprises the first picture in a first layer and a second picture in a second layer, the second layer being a dependent layer of the first layer, wherein the means for associating comprises: means for determining whether the first picture is known to be within a defined range for correct decoding of the first picture; and means for associating the at least one recovery point SEI message with the second picture in response to determining that the first picture is known to be within the defined range.

14. The apparatus of claim 11, further comprising means for associating a second region refresh SEI message with another picture of the subset of the plurality of pictures associated with the at least one recovery point SEI message, wherein the second region refresh SEI message indicates whether regions of the other picture to which the second region refresh SEI message applies belong to a refreshed region of the other picture.

15. The apparatus of claim 11, wherein the at least one recovery point SEI message comprises an indication of a recovery point picture and an exact match flag, the apparatus further comprising: means for determining whether decoding of the video information beginning at the access unit would result in the same recovery point picture as decoding the video information beginning at an intra random access point (IRAP) picture; and information would result in the same recovery point picture in response to determining that the decoding of the video information would result in the same recovery point picture.

16. A non-transitory computer readable storage medium having stored thereon instructions that, when executed, cause a processor of a device to: determine at least one picture among a plurality of pictures included within an access unit with which to associate at least one recovery point supplemental enhancement information (SEI) message, each of the plurality of pictures of the access unit being included within different layers of a multi-layer bitstream; associate the at least one recovery point SEI message with more than one picture included in the access unit, the at least one recovery point SEI message being contained by a scalable nesting SEI message and being indicative of a recovery point in which all pictures included in layers of the multi-layer bitstream associated with the recovery point SEI message will be correct in decoded content; identify a first picture from the more than one picture associated with the recovery point SEI message with which to associate a first region refresh SEI message, wherein the first region refresh SEI message indicates whether regions of the first picture to which the first region refresh SEI message applies belong to a refreshed region of the first picture; associate the first region refresh SEI message with the first picture, the first region refresh SEI message being indicative of whether individual slices of the first picture is correct in content after decoding; and code the video information based at least in part on the association of the at least one recovery point SEI message with the more than one picture and the association of the first region refresh SEI message with the first picture.

17. The non-transitory computer readable storage medium of claim 16, further having stored thereon instructions that, when executed, causes the processor to:
associate a first recovery point SEI message with the first picture of the access unit; and associate a second recovery point SEI message with a second picture of the access unit.

18. The non-transitory computer readable storage medium of claim 16, wherein the access unit comprises the first picture in a first layer and a second picture in a second layer, the second layer being a dependent layer of the first layer, the non-transitory computer readable storage medium further having stored thereon instructions that, when executed, cause the processor to: determine whether the first picture is known to be within a defined range for correct decoding of the first picture; and associate the at least one recovery point SEI message with the second picture in response to determining that the first picture is known to be within the defined range.

19. The non-transitory computer readable storage medium of claim 16, further having stored thereon instructions that, when executed, cause the processor to associate a second region refresh SEI message with another picture of the subset of the plurality of pictures associated with the at least one recovery point SEI message, wherein the second region refresh SEI message indicates whether regions of the other picture to which the second region refresh SEI message applies belong to a refreshed region of the other picture.

20. The non-transitory computer readable storage medium of claim 16, wherein the at least one recovery point SEI message comprises an indication of a recovery point picture and an exact match flag, the non-transitory computer readable storage medium further having stored thereon instructions that, when executed, cause the processor to:
determine whether decoding of the video information beginning at the access unit would result in the same recovery point picture as decoding the video information beginning at an intra random access point (TRAP) picture; and
set the exact match flag to indicate that the decoding of the video information would result in the same recovery point picture in response to determining that the decoding of the video information would result in the same recovery point picture.

* * * * *